(12) United States Patent
Henderson et al.

(10) Patent No.: US 10,996,793 B2
(45) Date of Patent: May 4, 2021

(54) CORRECTION OF VIBRATION-INDUCED ERROR FOR TOUCH SCREEN DISPLAY IN AN AIRCRAFT

(71) Applicant: GE Aviation Systems Limited, Cheltenham (GB)

(72) Inventors: George R. Henderson, Cheltenham (GB); Paul Richard Hickman, Cheltenham (GB); Luke Patrick Bolton, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 72 days.

(21) Appl. No.: 15/627,586

(22) Filed: Jun. 20, 2017

(65) Prior Publication Data
US 2017/0364207 A1    Dec. 21, 2017

(30) Foreign Application Priority Data
Jun. 20, 2016   (GB) ..................... 1610732

(51) Int. Cl.
*G06F 3/041*     (2006.01)
*G06F 3/0484*    (2013.01)
(Continued)

(52) U.S. Cl.
CPC .......... *G06F 3/04186* (2019.05); *B60K 35/00* (2013.01); *B64D 43/00* (2013.01);
(Continued)

(58) Field of Classification Search
CPC ............................................ B60K 2350/1028
See application file for complete search history.

(56) References Cited

U.S. PATENT DOCUMENTS 5,563,632 A * 10/1996 Roberts ............... G06F 3/04142
                                                      345/173
8,677,287 B2 * 3/2014 Shimotani ........... G06F 3/04886
                                                      715/864

(Continued)

FOREIGN PATENT DOCUMENTS

EP     2 363 785 A1    9/2011
EP     2 455 843 A2    5/2012
(Continued)

OTHER PUBLICATIONS

Search Report issued in connection with corresponding GB Application No. 1610732.8 dated Nov. 21, 2016.

*Primary Examiner* — William L Bashore
*Assistant Examiner* — Nathan K Shrewsbury
(74) *Attorney, Agent, or Firm* — Fitch, Even, Tabin & Flannery LLP

(57) ABSTRACT

Systems and methods for correcting a vibration-induced error on a touch screen display device on an aircraft are provided. A method can include providing a user interface for display on a touch screen display device. The user interface can include one or more virtual elements associated with functions to be performed by a component of the aircraft. The method can include receiving data indicative of an actual user interaction with the touch screen display device. The method can include receiving data indicative of an intended user interaction. The method can include receiving data indicative of a sensed vibration. The method can include determining a corrected user interaction corresponding to a selected virtual element based on the data received. The method can also include sending one or more command signals to one or more components to perform a function associated with the selected virtual element.

18 Claims, 6 Drawing Sheets

(51) Int. Cl.
  *B60K 35/00* (2006.01)
  *B64D 43/00* (2006.01)
  *G06F 3/0482* (2013.01)
(52) U.S. Cl.
  CPC ........ *G06F 3/0482* (2013.01); *G06F 3/04842* (2013.01); *B60K 2370/1438* (2019.05); *B60K 2370/1468* (2019.05); *B60K 2370/152* (2019.05); *B60K 2370/199* (2019.05); *B60K 2370/52* (2019.05)

(56) References Cited

U.S. PATENT DOCUMENTS

| | | | | |
|---|---|---|---|---|
| 8,825,234 B2* | 9/2014 | Williams | ............ | G06F 3/0418 701/8 |
| 9,229,575 B2* | 1/2016 | Mabie | ............ | G06F 3/0421 |
| 9,690,426 B1* | 6/2017 | Eichwald | ............ | G06F 3/04186 |
| 9,703,476 B1* | 7/2017 | Pappas | ............ | G06F 3/04847 |
| 9,710,145 B2* | 7/2017 | Zammit-Mangion | ............ | G06F 3/0488 |
| 9,733,707 B2* | 8/2017 | Kawalkar | ............ | G06F 3/016 |
| 9,733,739 B1* | 8/2017 | Yates | ............ | G06F 3/0412 |
| 9,858,823 B1* | 1/2018 | Lynn | ............ | G08G 5/0034 |
| 2008/0024459 A1* | 1/2008 | Poupyrev | ............ | G06F 3/016 345/173 |
| 2008/0055259 A1* | 3/2008 | Plocher | ............ | G06F 3/011 345/173 |
| 2009/0300531 A1* | 12/2009 | Pryor | ............ | G06F 3/011 715/764 |
| 2011/0141066 A1* | 6/2011 | Shimotani | ............ | G06F 3/04886 345/177 |
| 2011/0167391 A1* | 7/2011 | Momeyer | ............ | G06F 3/038 715/863 |
| 2011/0187651 A1 | 8/2011 | Whitlow et al. | | |
| 2011/0234639 A1* | 9/2011 | Shimotani | ............ | G06F 3/04886 345/661 |
| 2011/0267280 A1* | 11/2011 | De Mers | ............ | G06F 3/04886 345/173 |
| 2012/0026110 A1* | 2/2012 | Yamano | ............ | G06F 3/0418 345/173 |
| 2013/0033433 A1 | 2/2013 | Rogers et al. | | |
| 2013/0055080 A1* | 2/2013 | Komer | ............ | G06F 3/0418 715/709 |
| 2013/0091459 A1* | 4/2013 | Park | ............ | G06F 3/0485 715/784 |
| 2013/0100043 A1* | 4/2013 | Kolbe | ............ | B64D 43/00 345/173 |
| 2013/0201117 A1* | 8/2013 | Yeung | ............ | G06F 3/0418 345/173 |
| 2013/0314328 A1* | 11/2013 | Singer | ............ | G06F 3/0488 345/173 |
| 2014/0035827 A1* | 2/2014 | Hyde | ............ | G06F 1/1694 345/173 |
| 2014/0035829 A1* | 2/2014 | Hyde | ............ | G06F 3/04886 345/173 |
| 2014/0043241 A1* | 2/2014 | Sukumar | ............ | G06F 3/0418 345/173 |
| 2014/0062893 A1* | 3/2014 | Kawalkar | ............ | G06F 3/0488 345/173 |
| 2014/0107871 A1* | 4/2014 | Williams | ............ | G01C 21/20 701/3 |
| 2014/0160048 A1* | 6/2014 | Conway | ............ | G06F 3/041 345/173 |
| 2014/0164983 A1* | 6/2014 | Kawalkar | ............ | G06F 3/048 715/781 |
| 2014/0240242 A1* | 8/2014 | Kawalkar | ............ | G06F 3/0418 345/173 |
| 2015/0002403 A1* | 1/2015 | Dostal | ............ | G06F 3/04886 345/173 |
| 2015/0205437 A1* | 7/2015 | Takahashi | ............ | G06F 3/0412 345/178 |
| 2015/0261379 A1* | 9/2015 | Kneuper | ............ | G01C 23/00 345/173 |
| 2016/0179327 A1* | 6/2016 | Zammit-Mangion | ............ | G06F 3/0482 701/7 |
| 2016/0316186 A1* | 10/2016 | Krishnakumar | ...... | G06F 1/1605 |
| 2017/0210484 A1* | 7/2017 | Figard | ............ | B64D 45/00 |
| 2017/0228095 A1* | 8/2017 | Domaradzki | ............ | G06F 3/014 |
| 2018/0039401 A1* | 2/2018 | Freville | ............ | G06F 40/166 |

FOREIGN PATENT DOCUMENTS

| | | |
|---|---|---|
| EP | 2 667 295 A2 | 11/2013 |
| EP | 2 696 260 A2 | 2/2014 |
| WO | 2016/001446 A1 | 1/2016 |

\* cited by examiner

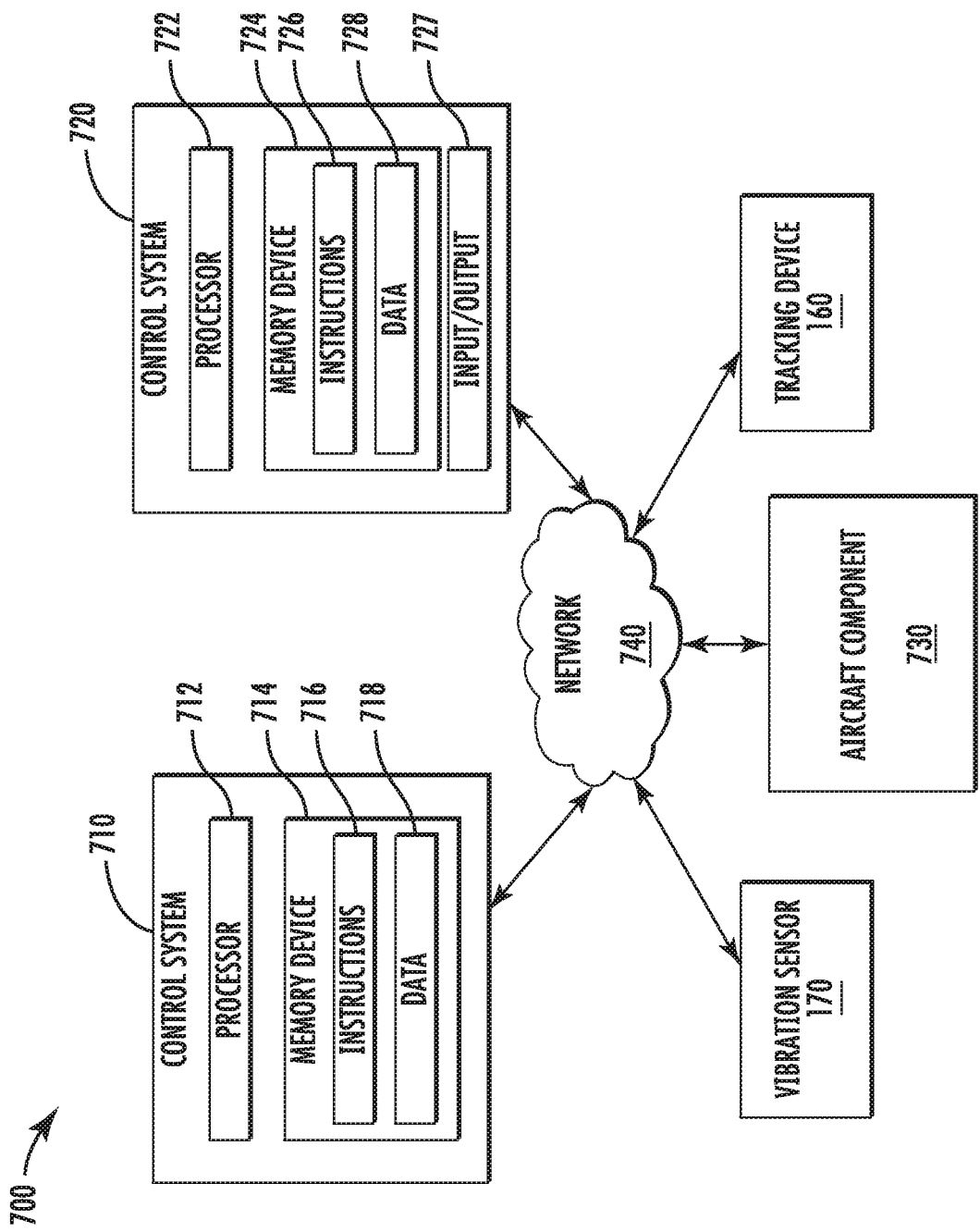

1

CORRECTION OF VIBRATION-INDUCED ERROR FOR TOUCH SCREEN DISPLAY IN AN AIRCRAFT

FIELD OF THE INVENTION

The present subject matter relates generally to correction of a vibration-induced error for a touch screen display, and more particularly, to correction of a vibration-induced error for a touch screen display in an aircraft.

BACKGROUND OF THE INVENTION

During aircraft operation, flight crew members can use touch screen display devices to perform various functions, such as input flight plan data or check weather conditions nearby. These touch screen display devices can allow for quick and efficient input and review of data and flight conditions, while condensing the function of several components into a single screen. The touch screen display device can display one or more user interfaces, which can be navigated by selecting virtual elements displayed on the touch screen display device with, for example, a finger or stylus.

However, during operation, the aircraft may encounter turbulence, gravitational forces, or mechanical vibrations, which can cause the flight crew member to have difficulty controlling his or her movement. In some cases, flight conditions can be so severe as to cause a flight crew member intending to select a particular element on a touch screen display device to inadvertently select an unintended element. The flight crew member may then need to re-enter the intended input on the touch screen display device, which may require navigating backwards through the user interface. This can lead to frustration on the part of the flight crew members and decreased efficiency due the need to re-enter the intended selection on the touch screen display device.

BRIEF DESCRIPTION

Aspects and advantages of the present disclosure will be set forth in part in the following description, or may be learned from the description, or may be learned through practice of the examples disclosed herein.

One example aspect of the present disclosure is directed to a computer-implemented method of correcting a vibration-induced input error on a touch screen display on an aircraft. The method can include providing for display, by one or more processors, a user interface on a touch screen display. The user interface can include one or more interactive virtual elements. Each virtual element can be associated with a function to be performed by a component of the aircraft during operation of the aircraft. The method can also include receiving, by the one or more processors, data indicative of an actual user interaction with the touch screen display. The method can also include receiving, by the one or more processors, data indicative of an intended user interaction. The method can also include receiving, by the one or more processors, data indicative of a sensed vibration from one or more vibration sensors located on the aircraft. The method can also include determining, by the one or more processors, a corrected user interaction corresponding to at least one selected virtual element based at least in part on the data indicative of the actual user interaction, the data indicative of the intended user interaction, and the data indicative of the sensed vibration. In response to the corrected user interaction, the method can also include sending, by the one or more processors, one or more command signals to one or more components of an aircraft to perform at least a portion of the function associated with the at least one selected virtual element.

Another example aspect of the present disclosure is directed to a system for correcting a vibration-induced input error on a touch screen display on an aircraft. The system can include a touch screen display device configured to display a user interface. The user interface can include one or more interactive virtual elements. Each virtual element can be associated with a function to be performed by a component of the aircraft during operation of the aircraft. The system can also include one or more vibration sensors located on the aircraft configured to obtain data indicative of a sensed vibration. The system can also include one or more tracking devices configured to obtain data indicative of an intended user interaction. The system can also include a control system configured to receive data indicative of an actual user interaction with at least one virtual element, receive data indicative of an intended user interaction, receive data indicative of a sensed vibration, determine a corrected user interaction corresponding to at least one selected virtual element based at least in part on the data indicative of the actual user interaction, the data indicative of the intended user interaction, and the data indicative of the sensed vibration, and in response to the corrected user interaction, to send one or more command signals to one or more components of the aircraft to perform at least a portion of the task associated with the at least one selected virtual element.

Yet another example aspect of the present disclosure is directed to an aircraft. The aircraft can include an engine. The aircraft can also include a fuselage. The aircraft can also include one or more vibration sensors. The aircraft can also include one or more tracking devices. The aircraft can also include a touch screen display device. The aircraft can also include a controller comprising one or more processors and one or more memory devices located on an aircraft. The one or more memory devices can store instructions that when executed by the one or more processors cause the one or more processors to perform operations. The operations can include providing for display a user interface on the touch screen display. The user interface can include one or more interactive virtual elements. Each virtual element can be associated with a function to be performed by a component of the aircraft during operation of the aircraft. The operations can also include receiving data indicative of an actual user interaction with the touch screen display. The operations can also include receiving data indicative of an intended user interaction from the one or more tracking devices. The operations can also include receiving data indicative of a sensed vibration from the one or more vibration sensors. The operations can also include determining a corrected user interaction corresponding to at least one selected virtual element based at least in part on the data indicative of the actual user interaction, the data indicative of the intended user interaction, and the data indicative of the sensed vibration. In response to the corrected user interaction, the operations can also include sending one or more command signals to one or more components of an aircraft to perform at least a portion of the function associated with the at least one selected virtual element.

Other example aspects of the present disclosure are directed to systems, methods, aircraft, avionics systems, devices, and non-transitory computer-readable media for correcting a vibration-induced error on a touch screen display device on an aircraft.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 7 depicts an example system according to example aspects of the present disclosure.

DETAILED DESCRIPTION OF THE INVENTION

Figure 1:
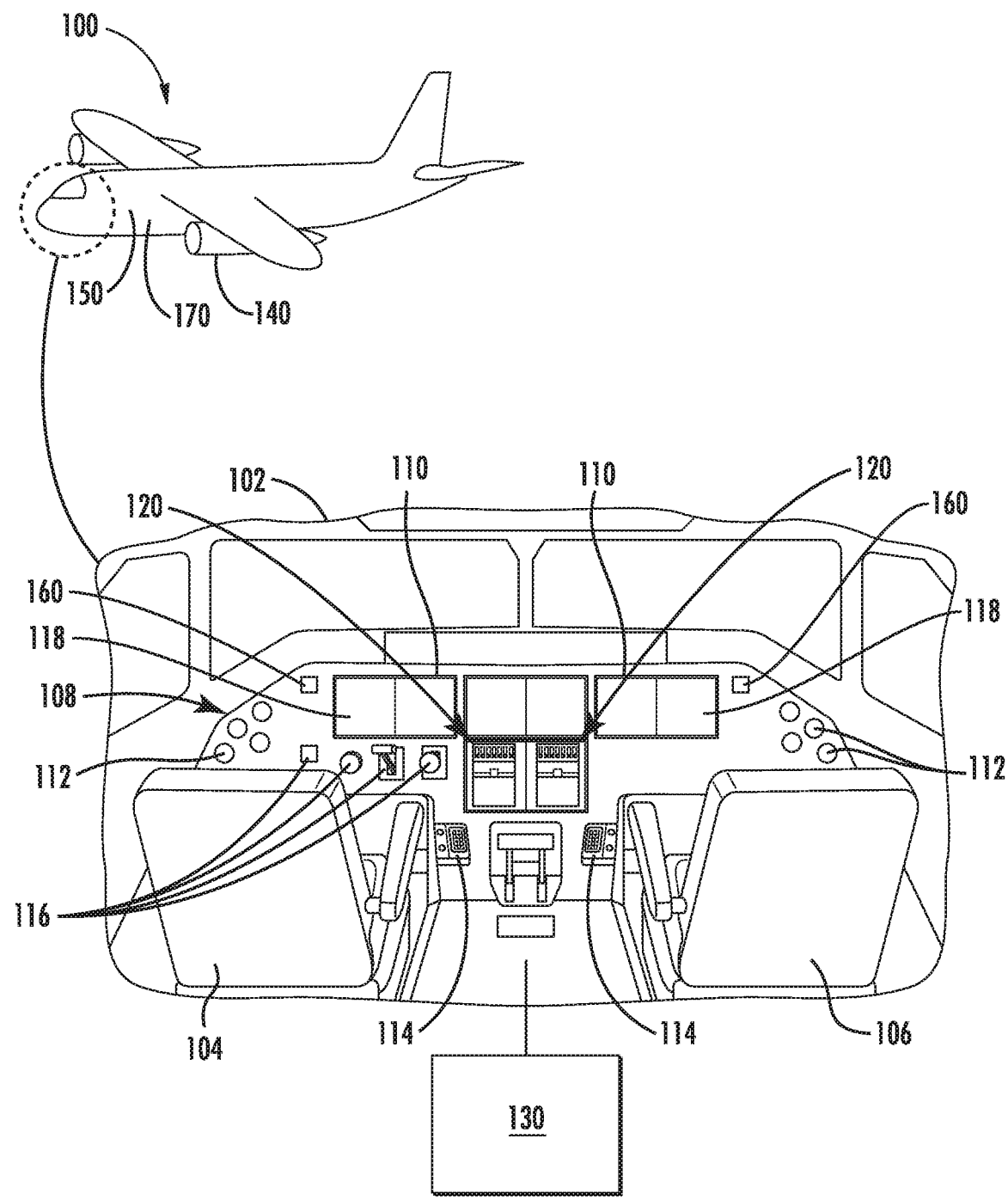
FIG. 1 depicts a perspective view of an example portion of an aircraft according to example aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for correcting a vibration-induced error with a touch screen display device on an aircraft. Touch screen display devices can be used by flight crew members to input and review data and flight conditions during operation of an aircraft. A user interface can be displayed on the touch screen display device, which can allow a flight crew member to navigate through various menus by selecting virtual elements displayed on the screen. For example, a flight crew member can input flight plan information into a flight control system by selecting a virtual element displayed on the touch screen display device corresponding to a flight plan by touching the virtual element with, for example, a finger or a stylus. Once the flight plan virtual element has been selected, a new menu with additional input options and/or information can be displayed to allow for quick and efficient entry of flight plan information.

During operation of the aircraft, however, flight conditions can cause flight crew members to have difficulty selecting a particular virtual element displayed on a touch screen display device. For example, an aircraft may encounter turbulence, gravitational effects, or mechanical vibration, which can cause a flight crew member to inadvertently select an element on a touch screen display device that was not the intended element. In such a case, the flight crew member may need to re-enter the correct selection, which can cause frustration for the flight crew member, and decrease the efficiency provided by using a touch screen display device. Further, if the vibrating flight conditions continue for a period of time, the flight crew member may have difficulty re-entering the correct selection, which can further exacerbate the flight crew member's frustration, and lead to further decreases in efficiency.

The systems and methods according to example aspects of the present disclosure can correct for vibration-induced input errors on a touch screen display device on an aircraft. For example, the systems and methods can provide a user interface on a touch screen display device in a cockpit of an aircraft. The user interface can include one or more virtual elements corresponding to various functions to be performed by one or more components of the aircraft. For example, a user interface can include virtual elements corresponding to a flight plan or weather conditions, which, when selected, can allow for entry of flight plan information or display of weather conditions, respectively. A flight crew member can interact with the virtual element (e.g., via a touch interaction with, for example, a finger or stylus) to complete the associated task.

A processor can be configured to receive data indicative of an actual user interaction with the touch screen display device, such as an input from the flight crew member. For example, when a flight crew member selects a virtual element by, for instance, touching the virtual element on the touch screen display device with the flight crew member's finger, the processor can receive data indicative of the selected virtual element.

The processor can be further configured to receive data from one or more vibration sensors located on the aircraft. For example, an accelerometer, velocity sensor, laser displacement sensor, proximity probe, or other vibration sensor can be located in a cockpit of an aircraft. The vibration sensor can be configured to sense a vibration, such as a vibration due to turbulence, gravitational force, or mechanical vibration, and send data indicative of the sensed vibration (e.g., data indicative of the duration and magnitude of the vibration) to the processor. Using this data, the processor can determine if a flight crew member's interaction with a touch screen display device was coincident with a sensed vibration, which can indicate an input error may have occurred.

The processor can be further configured to receive data indicative of an intended user interaction. For example, one or more tracking devices can be configured to track the flight crew member's interaction with the touch screen device. For example, in an embodiment, a camera can be configured to track a flight crew member's eye movement, and further configured to provide the processor data indicative of the object of visual focus of the flight crew member as the flight crew member interacts with the touch screen display device. The object of visual focus of the flight crew member can indicate the flight crew member intended to select an element corresponding to the object of the flight crew member's focus. Using this data, the processor can calculate an input error, such as a difference from an actual user interaction and the intended user interaction, as determined by the object of the flight crew member's focus.

In an embodiment, a tracking device, such as a camera, can be configured to track the movement of an input device used by a flight crew member to make a selection on the touch screen display device. For example, an input device can be the flight crew member's finger, hand, arm, or an object held by the flight crew member, such as a stylus. As used herein, the term "stylus" refers to any object used by a flight crew member to interact with a touch screen display device, and can include, without limitation, a capacitive stylus, a Wacom digitizer, a Bluetooth enabled stylus, a writing instrument, or any other device used to interact with a touch screen display device. As the flight crew member interacts with the touch screen display device, the tracking device can be configured to track the movement of the input device. Data indicative of the movement of the input device can then be provided to the processor, which can model the movement of the input device as it interacts with the touch screen display device. Using this data, the processor can calculate an intended user interaction based on the trajectory of the device and a sensed vibration. For example, a processor can be configured to model a user interaction had a sensed vibration not occurred. Using this data, the processor can calculate an input error, such as a difference from an actual user interaction and an intended user interaction, as determined based on the tracked movement of the input device.

Using the data indicative of a sensed vibration, the processor can be further configured to determine a disturbance probability. For example, a processor can be configured to determine a probability that an input error was caused by a sensed vibration. For example, if an input error is very high, but little to no sensed vibration occurred prior to or during the user interaction, a disturbance probability can be calculated that may indicate a low likelihood that the input error was caused by the sensed vibration. However, if an input error is very high, and a similarly high sensed vibration occurred prior to or during the user interaction, a disturbance probability can be calculated that may indicate a high likelihood that the input error was caused by the sensed vibration.

Based on the input error and the disturbance probability, the processor can determine a corrected user interaction. For example, if a disturbance probability is not high enough for a sensed vibration to have likely caused the input error, the processor can determine the corrected user interaction is the actual user interaction. However, if a disturbance probability is high enough for a sensed vibration to have likely caused an input error, the processor can determine a corrected user interaction based on the actual user interaction and the input error. For example, an actual user interaction may correspond with a first virtual element displayed at a first location on a user interface. However, an input error may indicate that a second virtual element located at a second position on the user interface was an intended user interaction. The processor can be configured to determine that the disturbance probability was sufficiently high for the sensed vibration to cause the input error, and correct the actual user interaction to the second location corresponding to the second virtual element by adjusting the actual user interaction by the input error. The processor can then send one or more command signals to one or more components of the aircraft to perform a function associated with the second virtual element. For example, the processor may send one or more command signals with a remote device, such as a control device located on the aircraft. Alternatively, the one or more control signals may be one or more instructions performed by the processor itself.

In this way, the systems and methods according to example aspects of the present disclosure can correct a vibration-induced error on a touch screen display device on an aircraft. The example systems and methods of the present disclosure can have a technical effect of reducing interaction errors, reducing flight crew member frustration, and increasing efficiencies associated with touch screen display device interactions.

With reference now to the FIGS., example embodiments of the present disclosure will be discussed in further detail. FIG. 1 depicts a perspective view of an example portion of an aircraft 100 according to example embodiments of the present disclosure. The aircraft 100 can include, for instance, a cockpit 102, an engine 140, and a fuselage 150. A first user (e.g., a first flight crew member, a pilot) can be present in a seat 104 at the left side of the cockpit 102 and another user (e.g., a second flight crew member, a co-pilot) can be present at the right side of the cockpit 102 in a seat 106. The aircraft 100 can include a flight deck 108, which can include one or more multifunctional flight display devices 110, which can be one or more touch screen display devices 118. The aircraft can also include one or more instruments 112. In some implementations, the one or more instruments 112 can be located on the flight deck 108 in front of the one or more users and can provide information to aid in flying the aircraft 100.

Aircraft 100 can include one or more physical control interfaces 116. A physical control interface 116 can be, for example, a control interface that is configured to adjust a setting, parameter, mechanism, and/or condition of the aircraft 100. The physical control interfaces 116 can include, for instance, a button, momentary push button, compressible button, a switch mechanism, sliding control, level, knob, gauge, etc.

The aircraft 100 can include one or more aircraft input devices 114 (e.g., in the cockpit 102) that can be used by one or more users to provide input to one or more processors and interact with the systems of the aircraft 100. The aircraft input devices 114 can include, for instance, any device suitable to accept input from a user and to convert that input to a graphical position on any of the multiple flight display screens 110. For instance, the one or more aircraft input devices 114 can include a joystick, multi-way rocker switches, mouse, trackball, keyboard, touch screen, touch pad, data entry keys, a microphone suitable for voice recognition, or any other suitable device. In some implementations, each user can have one or more separate aircraft input devices 114. Through use of the aircraft input devices 114, the one or more users can interact with the graphic and/or textual data elements provided for display on the screens of the display devices 110.

One or more user interfaces 120 can be displayed on the one or more display devices 110, including one or more touch screen display devices 118. For availability, one or more of the user interfaces 120 can be provided by a display device 110 on each side of the flight deck 108. In some implementations, one or more of the display devices 110 can be touch screen display devices 118 that can allow a user to visualize the user interface 120 on the touch screen display device 118 and interact with the user interface 120 through the touch screen display device 118. Additionally and/or alternatively, one or more of the display devices 110 can be operably coupled with the input devices 114 such that a user can interact with the user interface 120 (e.g., cursor interaction via trackball, mouse, etc.) and the textual and/or graphical elements included in the user interface 120.

According to example aspects of the present disclosure, the user interface 120 can include one or more virtual elements displayed on a touch screen display device 118. A user, such as a flight crew member, can interact with the virtual element through an actual user interaction. In one example, the virtual element can be a visual representation of a push button, and an associated actual user interaction can be, for example, a pushing touch interaction on the touch screen display device 118 to perform a function associated with the virtual element.

Each virtual element can be associated with a task to be performed by one or more components of the aircraft. A task can include one or more procedures that are required or recommended to be performed for operation of the aircraft 100. The one or more tasks can include procedures that are to be performed before, during, and/or after the operation of the aircraft 100. For instance, a task can include turning on window heat, arming emergency exit lights, checking fire warning, checking voice recorder, setting pressurization, checking instruments 112, verifying fuel quantity, releasing a parking brake, turning on a beacon, adjusting engine anti-ice, setting flaps, locking the cockpit door, turning on pilot heat, checking a transponder, adjusting landing lights, etc. Additionally, the one or more tasks can include one or more functions to be performed or displayed by the touch screen display device 118, such as opening a flight plan menu to allow a flight crew member to enter flight plan information or displaying weather condition information.

The one or more display devices 110, including one or more touch screen display devices 118, can be configured to be in wired and/or wireless communication with a control system 130. For instance, in some implementations, a touch screen display device 118 can communicate with the control system 130 via a network. The one or more touch screen display devices 118 can be configured to receive an actual user interaction with the user interface 120 and to provide data indicative of the actual user interaction to the control system 130. For instance, a user can provide a touch interaction with one or more virtual elements via a touch screen of touch screen display device 118. One or more of the touch screen display devices 118 can send data indicative of the actual user interaction with the virtual element to the control system 130. The control system 130 can be configured to receive data indicative of the actual user interaction with the virtual element.

A cockpit 102 can also include one or more tracking devices 160. The one or more tracking devices 160 can be configured to track a user interaction with a touch screen display device 118. For example, in an embodiment, a tracking device 160 can be a camera configured to track a flight crew member's movement and/or vision as the flight crew member interacts with a touch screen display device 118. As will be discussed in greater detail with respect to FIGS. 3 and 4, a tracking device 160 can be configured to provide data indicative of an intended user interaction to a control system 130.

The aircraft 100 can also include one or more vibration sensors 170 located on the aircraft, such as, for example, in the cockpit 102. The one or more vibration sensors 170 can be configured to sense a turbulence, a gravitational force, or a mechanical vibration. The one or more vibration sensors can be one or more accelerometers, velocity sensors, laser displacement sensors, proximity probes, or any other vibration sensor configured to sense a vibration. The control system 130 can further be configured to receive data indicative of a sensed vibration from the one or more vibration sensors 170 located on the aircraft 100.

In response to receiving the data indicative of an actual user interaction with a touch screen display device 118, the data indicative of an intended user interaction from the one or more tracking devices 160, and the data indicative of a sensed vibration from one or more vibration sensors 170, the control system 130, and more particularly, a processor in the control system 130, can be configured to determine a corrected user interaction corresponding to at least one selected virtual element on a user interface 120 displayed on a touch screen display device 118. The corrected user interaction can be an actual user interaction corrected for a vibration-induced error.

In response to determining the corrected user interaction, the control system 130 can be configured to send one or more signals (e.g., command signals) to one or more aircraft components (not shown) to complete the task associated with the selected virtual element. The control system 130 can be in wired or wireless communication with the one or more aircraft components. Additionally, and/or alternatively, the control system 130 can be configured to communicate with the aircraft components via a network. The one or more aircraft components can be one or more control devices configured to adjust, set, and/or otherwise change a parameter, state, mechanism, and/or condition of an aircraft. Additionally, the one or more aircraft components can include one or more touch screen display devices 118, and the task can be an interaction with a user interface 120 displayed on the one or more touch screen display devices 118, such as navigating through one or more menus to enter or access data or information displayed on the touch screen display device 118. For example, a task can include opening a flight plan menu on a touch screen display device 118 to allow a flight crew member to enter flight plan information.

In response to receiving the one or more command signals, the aircraft components can execute a control action to complete at least a portion of the task. For instance, in response to receiving one or more command signals to display a flight plan menu, the touch screen display device 118 can then display the current flight plan for the aircraft 100. Similarly, a corrected user interaction with a touch screen display device 118 can be used to control one or more control devices to complete a task associated with operation of an aircraft, such as, for example, setting a cabin pressurization setting or turning on a cabin heating unit.

Figure 2:
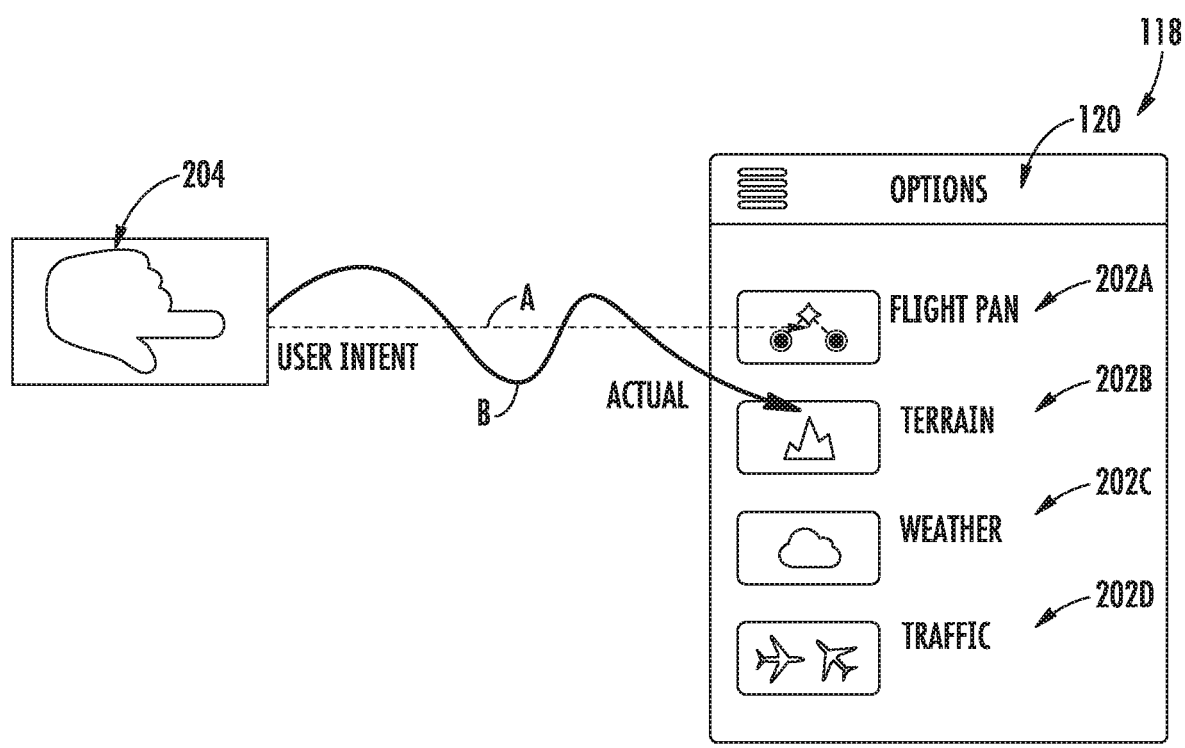
FIG. 2 depicts an schematic of an example interaction with a user interface addressed by the present disclosure.

Referring now to FIG. 2, a schematic of an example interaction with a user interface is provided. As depicted, a user interface 120 is displayed on a touch screen display device 118. As shown, the user interface 120 can include one or more virtual elements 202. For example, as depicted, four virtual elements 202A-D are shown. Each virtual element 202 can be associated with a function to be performed during operation of the aircraft 100. For example, virtual element 202A can be associated with a flight plan, which, when selected, can allow for the entry and review of flight plan information. Virtual element 202B can be associated with a terrain map, which, when selected, can allow for a graphical depiction of nearby terrain conditions. Virtual element 202C can be associated with weather conditions, which, when selected, can allow for display of weather conditions. Virtual element 202D can be associated with air traffic conditions, which, when selected, can allow for display of nearby air traffic, such as other aircraft in the vicinity.

Referring still to FIG. 2, an input device 204 can be used to interact with a user interface 120 displayed on a touch screen display device 118. For example, as depicted in FIG.

2, a user is interacting with a user interface by touching the one or more virtual elements with the user's finger. In another embodiment, an input device 120 could be a hand, an arm, or a stylus. As shown, a user may intend to interact with a particular virtual element 202 displayed on a user interface 120. For example, as shown, a line A corresponding to an intended user interaction is shown. As shown, the user intends to interact with virtual element 202A, which corresponds to a flight plan. However, an actual user interaction with a user interface 120 may be impacted by a vibration, such as a vibration due to turbulence, gravitational forces, or a mechanical vibration. For example, the actual user interaction, as depicted by line B, may correspond with an unintended virtual element, such as virtual element 202B, which corresponds to a terrain map as shown in FIG. 2. In such a case, an actual user interaction may differ from the intended user interaction due to a vibration-induced error.

Figure 3:
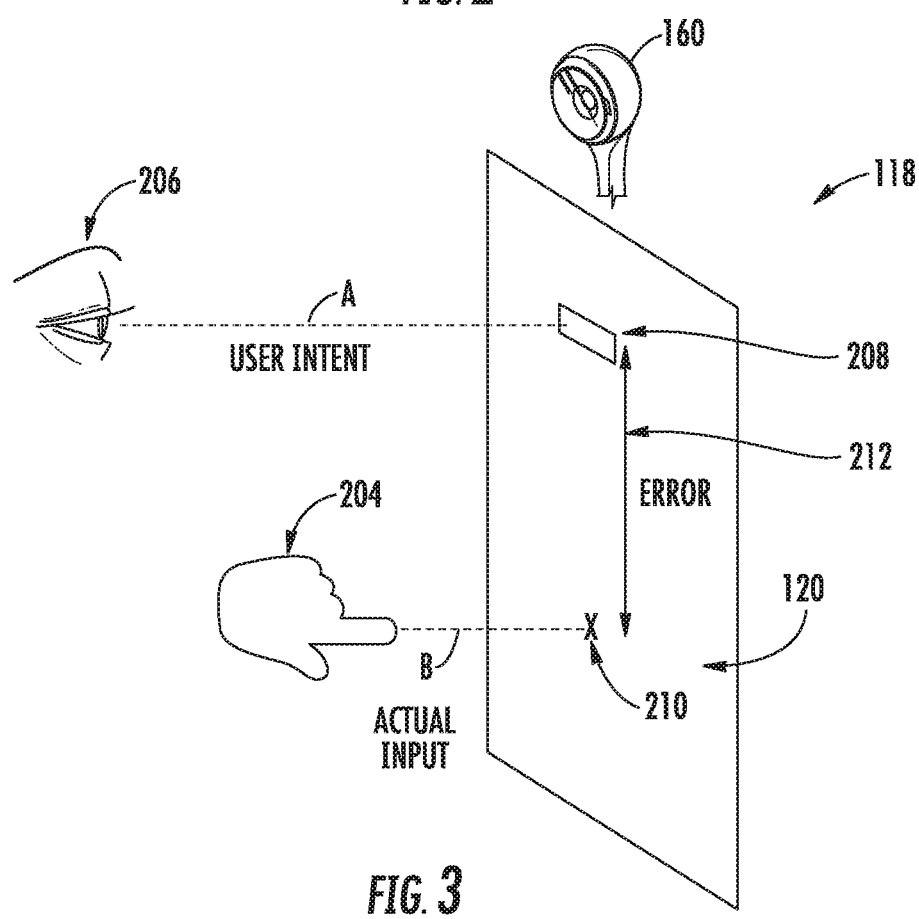
FIG. 3 depicts a schematic of an example interaction with a user interface according to example aspects of the present disclosure.

Referring now to FIG. 3, a schematic of an example interaction with a user interface according to example aspects of the present disclosure is provided. As depicted, a user interface 120 is displayed on a touch screen display device 118. As shown, a user 206 has an object of visual focus 208 in the user's eyesight. The object of visual focus 208 may correspond with one or more virtual elements, such as virtual elements 202A-D shown in FIG. 2. As shown by line A, the user 206 intends to interact with the object of visual focus 208. However, as shown by line B, the actual user interaction with the user interface 120 occurs at an error location 210, where the user's input device 204 (i.e., the user's finger) touches the touch screen display device 118. The touch screen display device 118 can be configured to provide data indicative of the actual user interaction to a processor in a control system, such as a processor in a control system 130 depicted in FIG. 1. For example, the data indicative of the actual user interaction can be data corresponding to error location 210.

According to example aspects of the present disclosure, a tracking device 160 can be used to obtain data indicative of an intended user interaction with a touch screen display device 118. For example, a tracking device 160 can be a camera configured to track a user's eyesight. In another embodiment, a tracking device 160 could be any device or system configured to track an object of visual focus 208 of a user. The tracking device 160 can be configured to provide data indicative of an object of visual focus 208 of the user 206 to a processor, such as processor in a control system 130 depicted in FIG. 1. For example, the tracking device 160 can provide a processor data indicative of an object of visual focus 208, and the processor can be configured to determine the object of visual focus 208 of the user 206 based on data provided.

The processor, such as a processor in a control system 130, can be further configured to determine an input error 212 based on the data received by the touch screen display device 118 and tracking device 160. For example, a user may intend to interact with a particular virtual element 202 on a touch screen display device 118, and in order to interact with the virtual element 202, the user may focus on the virtual element 202 as the user interacts with the touch screen display device 118. Accordingly, the data indicative of an object of a visual focus 208 can be data indicative of an intended user interaction. However, due to a vibration, such as turbulence, the user 206 may interact with the touch screen display device at an error location 210. The processor, such as a processor in a control system 130, can be configured to determine an input error 212 based at least in part on the data indicative of the intended user interaction.

The input error 212 may be, for instance, a difference between an actual user interaction (i.e., an error location 210) on a touch screen display device 118 and an object of the visual focus 208 of the user 206 (i.e. an intended user interaction).

Figure 4:
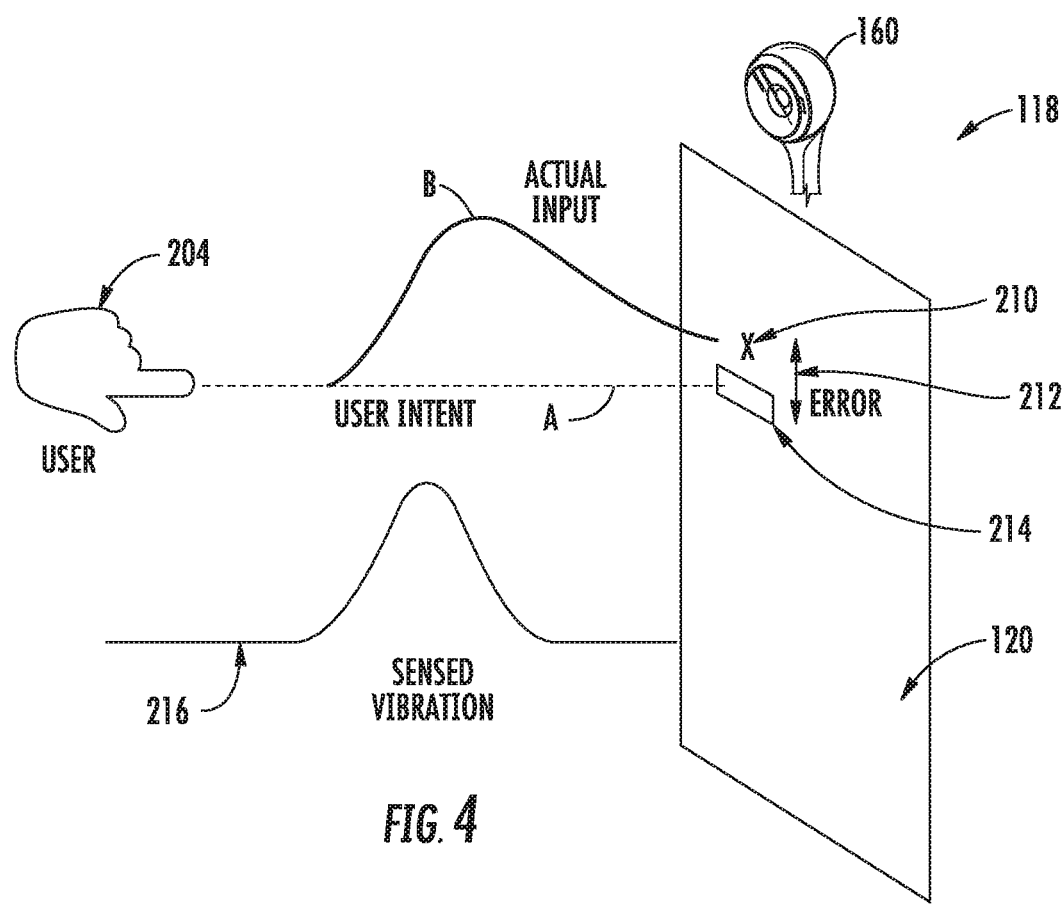
FIG. 4 depicts a schematic of an example interaction with a user interface according to example aspects of the present disclosure.

Referring now to FIG. 4, a schematic of an example interaction with a user interface according to example aspects of the present disclosure is provided. As depicted, a user interface 120 is displayed on a touch screen display device 118. As shown, an input device 204, such as a user's finger, is initially on a trajectory corresponding to a line A during interaction of the user with the touch screen display device 118 before a sensed vibration 216 occurs.

According to example aspects of the present disclosure, a tracking device 160 can be used to obtain data indicative of a user's intended interaction with a touch screen display device 118. For example, a tracking device 160 can be a camera configured to track the movement of an input device 204, such as a user's finger, during interaction of a user with a touch screen display device 118. In another embodiment, a tracking device 160 could be any other device or system configured to track the movement of an input device 204, such as a wireless system configured to track the movement of a stylus as the stylus interacts with a touch screen display device 118. The tracking device 160 can be configured to obtain data indicative of an intended user interaction, such as the movement of an input device 204 as the input device 204 interacts with the touch screen display device 118. The tracking device 160 can be further configured to provide data indicative of an intended user interaction, such as data regarding the movement of an input device 204, to a processor, such as a processor in a control system 130 depicted in FIG. 1.

As depicted in FIG. 4, as the input device 204 moves toward the touch screen display device 118, a sensed vibration 216 occurs. As the sensed vibration 216 occurs, the user's actual movement corresponds to line B, rather than line A. The sensed vibration 216 may be a vibration, such as turbulence, a gravitational force, or a mechanical vibration. The sensed vibration 216 may be sensed by one or more vibration sensors 170 located on the aircraft. The vibration sensors 170 may obtain data indicative of the sensed vibration, such as data regarding the time, duration, and magnitude of the sensed vibration 216, and provide the data indicative of the sensed vibration 216 to a processor, such as a processor in a control system 130. As depicted in FIG. 4, following the sensed vibration 216, an actual user interaction, or an input, received by the input device 204 occurs at error location 210 on the touch screen display device 118. The touch screen display device 118 can be configured to provide data indicative of the actual user interaction, or input, such as data corresponding to error location 210 received by the input device 204, to a processor.

The processor, such as a processor in a control system 130, can be configured to model an effect of the sensed vibration 216 on the input device 204. For example, using data indicative of the actual user interaction, such as data corresponding to an error location 210, and data indicative of an intended user interaction, such as data indicative of the movement of the input device 204 as it interacts with a touch screen display device 118 obtained by a tracking device 160, the processor can determine a modeled input 214 had the sensed vibration 216 not occurred. For example, the processor may determine that, had the sensed vibration not occurred, the input device 204 may have moved along a line A to interact with the touch screen display device 118 at a location corresponding to modeled input 214. As shown, line A corresponding to an intended user input is a substantially straight line as the input device 204 interacts with the touch screen display device 118. However, a model of a user interaction need not be a straight-line model, but rather, can be any model configured to determine a modeled input 214 had a sensed vibration 216 not occurred. Based on the location of modeled input 214 and the error location 210, the processor can be further configured to determine an input error 212. For example, the input error can be a difference between the actual user interaction, or input, received at error location 210 and the location of the modeled input 212 had the sensed vibration 216 not occurred.

In an embodiment, the one or more tracking devices 160 can be further configured to determine an object of a visual focus of a user, such as an object of a visual focus 208 of a user 206 as depicted in FIG. 3, in addition to tracking the movement of an input device 204. The data indicative of an intended user interaction provided to the processor can further be data indicative of the object of the visual focus 208 of the user 206. The processor can be configured to determine the input error based on determining a difference between the data indicative of the actual user interaction, or input, such as an error location 210, and data indicative of the object of the visual focus of the user, such as the object of the visual focus 208 of the user 206 as depicted in FIG. 3.

Figure 5:
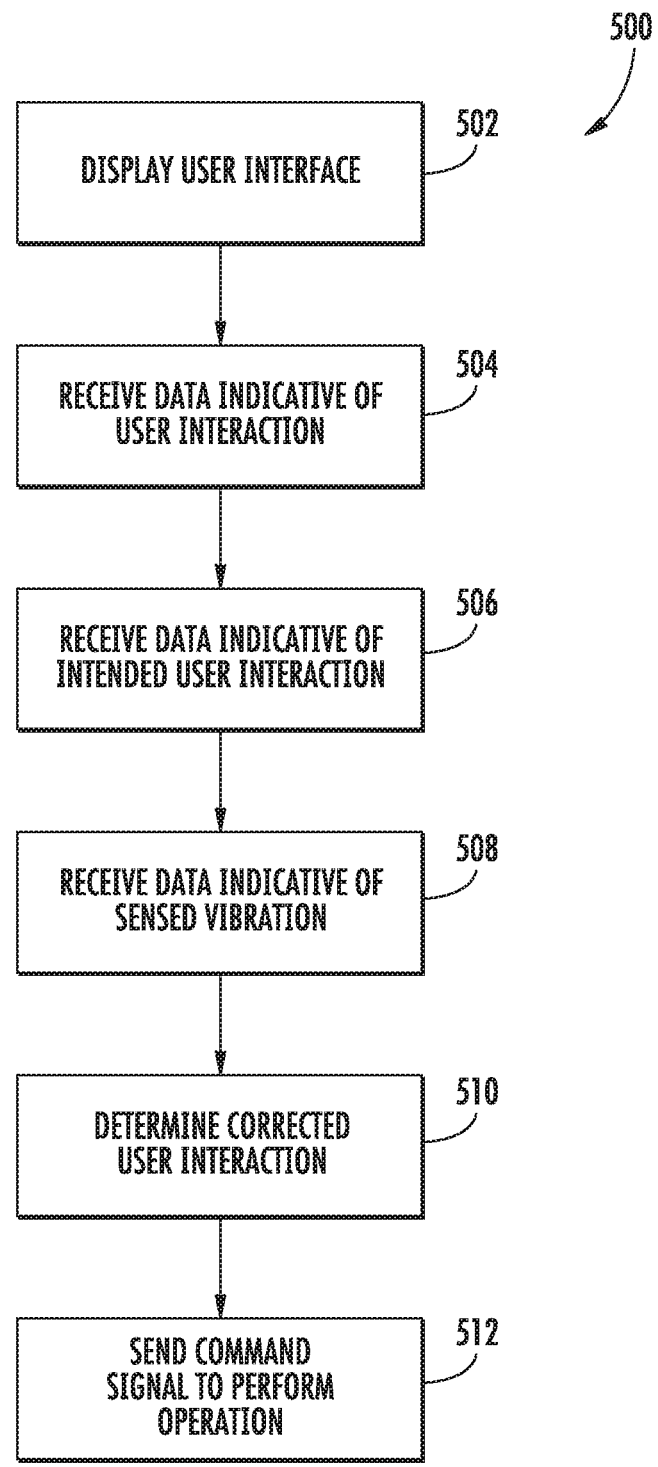
FIG. 5 depicts an example method according to example aspects of the present disclosure.

Referring now to FIG. 5, a flow diagram of an example method (500) according to example embodiments of the present disclosure is depicted. The method (500) can be implemented by one or more processors, such as a processor in the control system 130 depicted in FIG. 1. In addition, FIG. 5 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (502), the method 500 can include providing for display a user interface on a touch screen display device, the user interface including one or more interactive virtual elements, each virtual element associated with a function to be performed by a component of the aircraft during operation of the aircraft. For example, a user interface 120 can be provided for display on a touch screen display device 118. The user interface 120 can include one or more virtual elements, such as virtual elements 202A-D depicted in FIG. 2. Each virtual element can be associated with a function to be performed by a component of the aircraft during operation of the aircraft, such as opening a flight plan menu to allow for the entry of flight plan information, or displaying current weather conditions nearby.

At (504), the method 500 can include receiving data indicative of an actual user interaction with the touch screen display device. For example, a processor in the control system 130 can receive data indicative of an actual user interaction with a touch screen display device 118, such as an interaction at an error location 210. The actual user interaction can be a touch interaction on the touch screen display device 118, which can be received by an input device, such as a finger, hand, arm or stylus. The touch screen display device 118 can send data indicative of the actual user interaction to the processor of a control system 130 and the processor of the control system 130 can receive the data from the touch screen display device 118.

At (506), the method can include receiving data indicative of an intended user interaction. For example, a tracking device 160 can be configured to track a user as the user interacts with the touch screen display device 118. For example, the tracking device 160 can track an object of visual focus of a user, such as an object of visual focus 208 depicted in FIG. 3. Additionally, the tracking device 160 can be configured to track the movement of an input device, such as an input device 204 as depicted in FIG. 4. The tracking device 160 can be, for example, a camera. The data indicative of the intended user interaction can be data indicative of the object of visual focus 208 of the user 206, and/or the data indicative of the intended user interaction can be data indicative of the movement of the input device 204. The processor of the control system 130 can receive the data indicative of the intended user interaction.

At (508), the method can include receiving data indicative of a sensed vibration. For example, a vibration sensor 170 can be located on the aircraft, and can be configured to sense a vibration on the aircraft, such as a turbulence, gravitational force, or mechanical vibration. For example, a sensed vibration can be a sensed vibration 216 as depicted in FIG. 4. The vibration sensor 170 can be configured to provide data indicative of the sensed vibration to the processor in the control system 130. The processor of the control system 130 can receive the data indicative of the sensed vibration.

At (510), the method can include determining a corrected user interaction corresponding to at least one selected virtual element based at least in part on the data indicative of the actual user interaction, the data indicative of the intended user interaction, and the data indicative of the sensed vibration. For example, the processor may determine that a sensed vibration caused an actual user interaction to be different from an intended user interaction due to a sensed vibration. The processor may correct the user interaction to a corrected user interaction corresponding to the intended user interaction. The corrected user interaction can correspond to at least one virtual element, such as a virtual element 204A-D, displayed on a user interface 120 on a touch screen display device 118.

Figure 6:
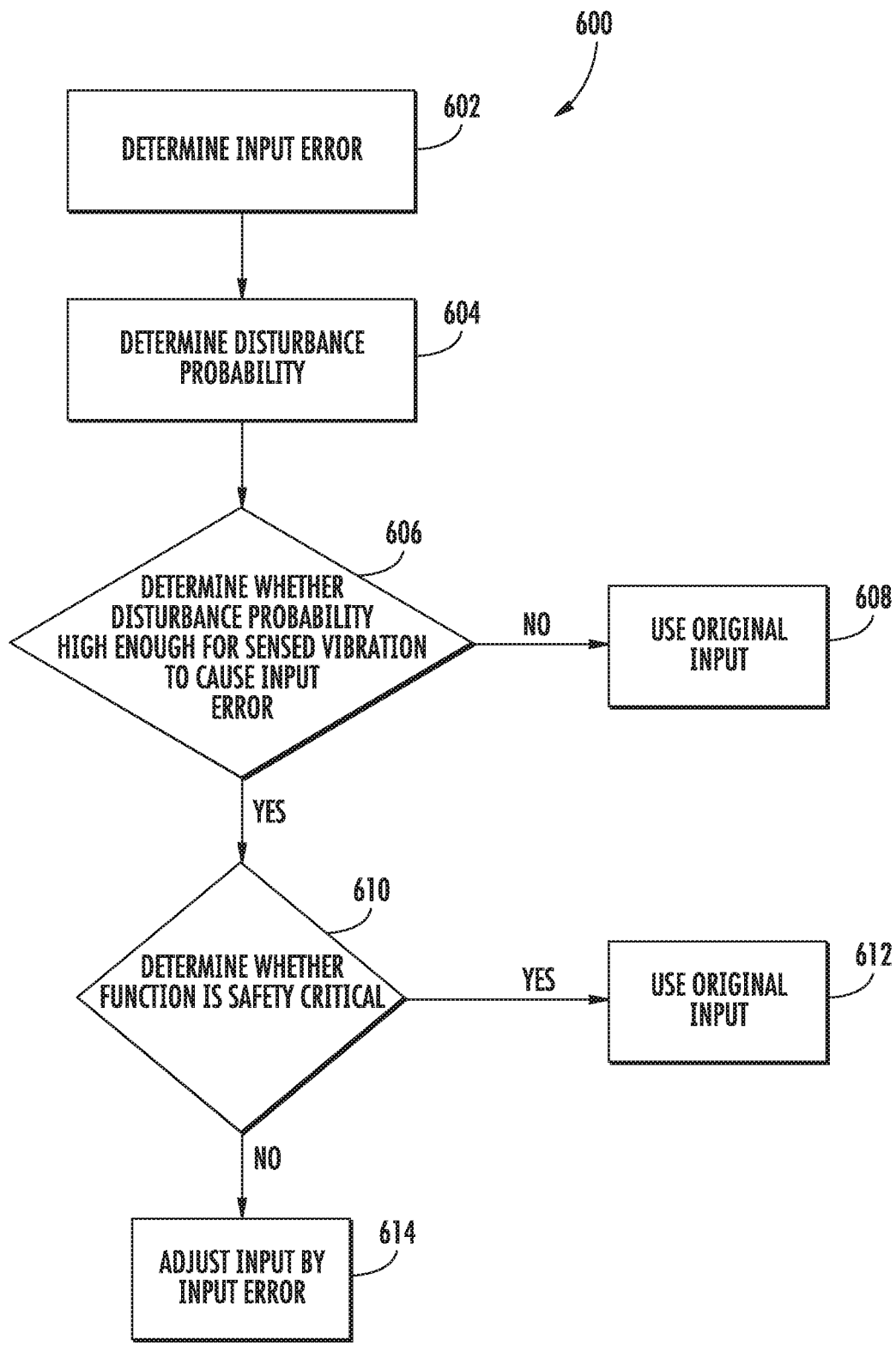
FIG. 6 depicts an example method according to example aspects of the present disclosure.

Referring now to FIG. 6, a method (600) according to example embodiments of the present disclosure is depicted. The method (600) can be used, for example, to determine a corrected user interaction, such as a corrected user interaction determined by a processor at (510) in a method (500).

At (602), the method can include determining an input error. For example, an input error can be based at least in part on a data indicative of an intended user interaction received by a processor in a control system 130. The data indicative of an intended user interaction can be data received from one or more tracking devices, such as one or more tracking devices 160 depicted in FIGS. 2 and 3. The tracking devices can be, for example, one or more cameras.

Additionally, the one or more tracking devices, such as one or more tracking devices 160, can be configured to track an object of a visual focus of the user, as depicted in FIG. 3. The processor can be configured to determine the input error based at least in part on the data provided by the one or more tracking devices. For example, a tracking device 160 may track an object of a visual focus 208 of a user 206. The tracking device 160 can provide data indicative of the object of the visual focus 208 of the user 206 to the processor. The processor may also receive data indicative of an actual user interaction, such as data indicative of an error location 210 received from a touch screen display device 118. The processor can be configured to determine an input error, such as an input error 212 corresponding to a difference between the object of visual focus 208 and the error location 210.

Additionally and/or alternatively, the one or more tracking devices can be configured to track the movement of an input device, such as an input device 204 depicted in FIG. 4. The processor can be configured to receive data indicative of the movement of the input device, and model an input had a sensed vibration not occurred. For example, a processor can determine a modeled input 214 had a sensed vibration 216 not occurred based on data provided by a tracking device 160. The processor can be further configured to determine an input error based on the modeled input and data indicative of an actual user interaction, such as an error location 210. For example, an input error can be a difference between the modeled input 214 and the error location 210.

At (604), the method can include determining a disturbance probability. The disturbance probability can be a probability that an input error was caused by a sensed vibration. For example, a processor can receive data indicative of a sensed vibration, such as data received by one or more vibration sensors 170. The data indicative of a sensed vibration can be, for example, data indicative of the magnitude of a vibration, the time a vibration began, and the duration of the vibration. Based on the data indicative of the sensed vibration, the processor can determine a probability that an input error was caused by the sensed vibration. For example, if a large magnitude sensed vibration occurs at a time coincident with a large input error, the processor may determine that there is a high likelihood that the input error was caused by the sensed vibration. Additionally, if little to no vibration occurred during a user interaction in which a large input error is determined, a processor may determine that there is a low likelihood that the input error was caused by the sensed vibration.

At (606), the method can include determining whether a disturbance probability is high enough for a sensed vibration to have caused an input error to have occurred. For example, if a disturbance probability is low and an input error is high, the processor can determine that the input error was likely not caused by a sensed vibration. In such a case, the processor can disregard the input error, and determine the corrected user interaction is the actual user interaction received by a touch screen display device 118. Accordingly, the processor can use the original input, or actual user interaction, as shown at (608). In this way, a corrected user interaction can be based at least in part on the disturbance probability.

If, however, the disturbance probability is high enough for a sensed vibration to have caused an input error to occur, at (610), the processor can determine whether the function corresponding to the actual user interaction is a safety critical function. For example, an actual user interaction could correspond to entering a flight plan parameter that would avoid a collision with another aircraft. An intended user interaction, by contrast, could correspond to entering a flight plan parameter that would not avoid the collision with another aircraft. In such a case, the processor can determine that the actual user interaction corresponds to a safety critical function, and could disregard the input error, and determine that the corrected user interaction is the actual user interaction received by a touch screen display device 118. Accordingly, the processor can use the original input, or actual user interaction, as shown at (612). In this way, a corrected user interaction can be the data indicative of the actual user interaction when the data indicative of the actual user interaction comprises selection of a virtual element that comprises a safety critical function.

If, however, the function corresponding to the actual user interaction is not a safety critical function, at (614), the processor can adjust the actual user interaction, or input, by the input error. For example, as depicted in FIG. 3, an input error 212 can correspond to difference between an error location 210 and an object of a visual focus 208 of a user 206. The processor can determine that the user 206 intended to interact with the touch screen display device 118 at a location corresponding to the object of visual focus 208. Accordingly, the processor can adjust data indicative of the actual user interaction corresponding to the error location 210 by the input error 212. Thus, the corrected user interaction could be a location on the touch screen display device 118 corresponding to the object of visual focus 208. Further, the corrected user interaction can be a virtual element, such as a virtual element 204A-D corresponding to the location of the object of visual focus 208. Similarly, the corrected user interaction could correspond to a virtual element corresponding to the modeled input 214, as depicted in FIG. 4. In this way, the corrected user interaction can be a selected virtual element on the touch screen interface corresponding to the location of the data indicative of the actual user interaction adjusted by the input error.

Referring back to FIG. 5, in response to determining a corrected user interaction at (510), at (512), the method (500) can include sending one or more command signals to one or more aircraft components to perform at least a portion of the task associated with the at least one selected virtual element. For instance, the processor in a control system 130 can, in response to the corrected user interaction, send one or more command signals to one or more aircraft components to perform at least a portion of a task associated with the selected virtual element. For example, a selected virtual element can be a virtual element associated with a flight plan, such as virtual element 202A depicted in FIG. 2. The processor can send one or more command signals to a touch screen display device 118 to open a menu corresponding to a flight plan in order to allow a flight crew member to enter or review flight plan information. Thus, as depicted in FIG. 2, while the actual user interaction corresponded to a virtual element 202B, the processor can correct the user interaction, and perform a function corresponding to the selected virtual element 202A. In this way, the method (500) according to example aspects of the present disclosure can correct a vibration-induced error with a touch screen display device.

FIG. 7 depicts an example system 700 according to example embodiments of the present disclosure. As shown, the system 700 can include a control system 710 and one or more display devices 720. The control system 710 can correspond to the control system 130 as described in example embodiments of the present disclosure. The one or more display devices 720 can correspond to the one or more touch screen display devices 118 as described in example embodiments of the present disclosure.

The control system 710 can include one or more processors 712 and one or more memory devices 714. The control system 710 can also include a network interface used to communicate with the display device 720 and/or one or more aircraft components 730 over a network 740. The one or more components 730 can include on or more aircraft control devices, one or more display devices 110, and one or more touch screen display devices 118. The network interface can include any suitable components for interfacing with one more networks, including for example, transmitters, receivers, ports, controllers, antennas, or other suitable components. The network 740 can include a data bus or a combination of wired and/or wireless communication links. The network 740 can be any type of communications network, such as a local area network (e.g. intranet), wide area network (e.g. Internet), cellular network, or some combination thereof.

The one or more processors 712 can include any suitable processing device, such as a microprocessor, microcontroller, integrated circuit, logic device, or other suitable processing device. The one or more memory devices 714 can include one or more computer-readable media, including, but not limited to, non-transitory computer-readable media, RAM, ROM, hard drives, flash drives, or other memory devices. The one or more memory devices 714 can store information accessible by the one or more processors 712, including computer-readable instructions 716 that can be executed by the one or more processors 712. The instructions 716 can be any set of instructions that when executed by the one or more processors 712, cause the one or more processors 712 to perform operations.

As shown in FIG. 7, the one or more memory devices 714 can also store data 718 that can be retrieved, manipulated, created, or stored by the one or more processors 712. The data 718 can include, for instance, data associated with virtual elements, tasks, control actions, and/or the aircraft control devices associated therewith. The data 718 can be stored in one or more databases. The one or more databases can be connected to the control system 710 by a high bandwidth LAN or WAN, or can also be connected to the control system 710 through network 740. The one or more databases can be split up so that they are located in multiple locales.

The display device 720 can include one or more processors 722 and one or more memory devices 724. The display device 720 can also include a network interface used to communicate with the control system 710 and/or one or more aircraft control devices 710 over a network 740. The network interface can include any suitable components for interfacing with one more networks, including for example, transmitters, receivers, ports, controllers, antennas, or other suitable components.

The one or more processors 722 can include any suitable processing device, such as a microprocessor, microcontroller, integrated circuit, logic device, or other suitable processing device. The one or more memory devices 724 can include one or more computer-readable media, including, but not limited to, non-transitory computer-readable media, RAM, ROM, hard drives, flash drives, or other memory devices. The one or more memory devices 724 can store information accessible by the one or more processors 722, including computer-readable instructions 726 that can be executed by the one or more processors 722. The instructions 726 can be any set of instructions that when executed by the one or more processors 722, cause the one or more processors 722 to perform operations. The instructions 726 can be executed by the one or more processors 722 to display, for instance, a user interface on an input/output device 727. The instructions 726 and/or other programs executed by the one or more processors 722 can allow a user to perform functions on a screen surface such as providing user interactions (e.g., touch, cursor) with virtual elements and inputting commands and other data through the screen surface.

The one or more memory devices 724 can also store data 728 that can be retrieved, manipulated, created, or stored by the one or more processors 722. The data 148 can include, for instance, data associated with a user interface, operations checklist, checklist items, tasks, virtual elements, and/or other information associated therewith. The data 728 can be stored in one or more databases. The one or more databases can be connected to the display device 720 by a high bandwidth LAN or WAN, or can also be connected to the display device 720 through the network 740. The one or more databases can be split up so that they are located in multiple locales.

The display device 720 can include an input/output device 727. The input/output device 727 can include a touch screen surface. Such touch screen surface can include any suitable form including that of a liquid crystal display (LCD) and can use various physical or electrical attributes to sense inputs and interactions from a user. The input/output device 727 can also include a trackball, mouse, other cursor device, touch pad, data entry keys, a microphone suitable for voice recognition, and/or other suitable input devices. The input/output 727 can also include other suitable output devices, such as other audio or visual outputs suitable for indicating the elements of a user interface (e.g., tasks associated with checklist items).

The system 700 can include one or more vibration sensors 170. The one or more vibration sensors 170 can be configured to provide data indicative of a sensed vibration to the control system 710, as discussed herein. The system 700 can also include on or more tracking devices 160. The one or more tracking devices can be configured to provide data indicative of an intended user interaction, as discussed herein.

The technology discussed herein makes reference to computer-based systems, as well as, actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A computer-implemented method of correcting a vibration-induced input error on a touch screen display device on an aircraft, comprising:
providing for display, by one or more processors, a user interface on a touch screen display device, the user interface comprising one or more interactive virtual elements, each virtual element associated with a function to be performed by a component of the aircraft during operation of the aircraft;

receiving, by the one or more processors, data indicative of a touch interaction with the touch screen display device;

receiving, by the one or more processors, data indicative of an intended user interaction with the touch screen display device;

receiving, by the one or more processors, data indicative of a sensed vibration from one or more vibration sensors located on the aircraft;

determining, by the one or more processors, an input error based at least in part on the data indicative of the intended user interaction and the data indicative of the touch interaction with the touch screen display device;

determining, by the one or more processors, a disturbance probability, the disturbance probability being a probability that the input error was caused by the sensed vibration;

determining, by the one or more processors, whether the disturbance probability is sufficiently high for the sensed vibration to have caused the input error;

determining, by the one or more processors, a corrected user interaction corresponding to at least one selected virtual element based at least in part on whether the disturbance probability is sufficiently high for the sensed vibration to have caused the input error: and in response to the corrected user interaction, sending, by the one or more processors, one or more command signals to one or more components of the aircraft to perform at least a portion of the function associated with the at least one selected virtual element.

2. The method of claim 1, wherein the data indicative of the intended user interaction comprises data from one or more tracking devices.

3. The method of claim 2, wherein the one or more tracking devices are configured to track an object of a visual focus of the user, wherein the data indicative of the intended user interaction comprises data indicative of the object of the visual focus of the user.

4. The method of claim 3, wherein the touch interaction occurs at an error location, and wherein determining the input error comprises determining a distance between the error location of the touch interaction and a location of the object of the visual focus of the user.

5. The method of claim 2, wherein an input device is used for the touch interaction with the touch screen display device, wherein the one or more tracking devices are configured to track a movement of the input device, wherein data indicative of the intended user interaction comprises data indicative of the movement of the input device.

6. The method of claim 5, wherein the touch interaction occurs at an error location, and wherein determining the input error comprises modeling an effect of the sensed vibration on the input device to determine a location the touch interaction would have occurred had the sensed vibration not occurred, wherein the input error is descriptive of a distance between the error location and the location the touch interaction would have occurred had the sensed vibration not occurred.

7. The method of claim 6, wherein the one or more tracking devices are further configured to determine an object of a visual focus of the user, wherein the data indicative of the intended user interaction further comprises data indicative of the object of the visual focus of the user, wherein determining the input error further comprises determining a difference between the data indicative of the touch interaction and the data indicative of the object of the visual focus of the user.

8. The method of claim 1, wherein the corrected user interaction comprises selecting a virtual element on the touch screen interface corresponding to the location of the data indicative of the touch interaction adjusted by the input error.

9. The method of claim 1, wherein the corrected user interaction comprises the data indicative of the touch interaction when the data indicative of the touch interaction comprises selection of a virtual element that comprises a safety critical function.

10. The method of claim 1, wherein the sensed vibration comprises at least one of a turbulence, a gravitational force, or a mechanical vibration.

11. The method of claim 1, wherein the data indicative of the sensed vibration indicates a time, a duration, and a magnitude of the sensed vibration.

12. A system for correcting a vibration-induced input error on a touch screen display device on an aircraft, comprising:

a touch screen display device configured to display a user interface, the user interface comprising one or more interactive virtual elements, each virtual element associated with a function to be performed by a component of the aircraft during operation of the aircraft;

one or more vibration sensors located on the aircraft and configured to obtain data indicative of a sensed vibration;

one or more tracking devices configured to obtain data indicative of an intended user interaction; and a control system configured to:
  receive data indicative of a touch interaction with at least one virtual element;
  receive data indicative of an intended user interaction with the touch screen display device;
  receive data indicative of a sensed vibration;
  determine an input error based at least in part on the data indicative of the intended user interaction and the data indicative of the touch interaction;
  determine a disturbance probability, the disturbance probability being a probability that the input error was caused by the sensed vibration;
  determine whether the disturbance probability is sufficiently high for the sensed vibration to have caused the input error;
  determine a corrected user interaction corresponding to at least one selected virtual element based at least in part on whether the disturbance probability is sufficiently high for the sensed vibration to have caused the input error; and
  in response to the corrected user interaction, to send one or more command signals to one or more components of the aircraft to perform at least a portion of the task associated with the at least one selected virtual element.

13. The system of claim 12, wherein the one or more tracking devices are configured to determine an object of a visual focus of the user, wherein the data indicative of the intended user interaction comprises data indicative of the object of the visual focus of the user, wherein determining the input error comprises determining a difference between the data indicative of the touch interaction and the data indicative of the object of the visual focus of the user.

14. The system of claim 12, wherein the data indicative of the touch interaction comprises an input on the touch screen display device received by an input device, wherein the one or more tracking devices are configured to track a movement of the input device, wherein determining the input error comprises modeling an effect of the sensed vibration on the input device, wherein the input error comprises a difference between the input and a modeled input had the sensed vibration not occurred.

15. An aircraft, comprising:
an engine;
a fuselage;
one or more vibration sensors;
one or more tracking devices;
a touch screen display device; and
a controller comprising one or more processors and one or more memory devices located on an aircraft, the one or more memory devices storing instructions that when executed by the one or more processors cause the one or more processors to perform operations, the controller configured to:
provide for display a user interface on the touch screen display device, the user interface comprising one or more interactive virtual elements, each virtual element associated with a function to be performed by a component of the aircraft during operation of the aircraft;
receive data indicative of an actual user interaction with the touch screen display device, the actual user interaction indicative of an actual input location at which the touch screen display device is touched;
receive data indicative of a sensed vibration from the one or more vibration sensors;
receive data indicative of a trajectory of an input device from the one or more tracking devices;
determine an intended user interaction based at least in part on the received data indicative of the sensed vibration and the received data indicative of the trajectory of the input device, the intended user interaction indicative of an intended input location at which the touch screen display device was intended to be touched;
determine an input error descriptive of a distance between the actual input location and the intended input location and a direction of the actual input location relative to the intended input location;
determine a disturbance probability, the disturbance probability being a probability that the input error was caused by the sensed vibration;
determine whether the disturbance probability is sufficiently high for the sensed vibration to have caused the input error;
determine a corrected user interaction corresponding to at least one selected virtual element based at least in part on whether the disturbance probability is sufficiently high for the sensed vibration to have caused the input error; and
in response to the corrected user interaction, sending one or more command signals to one or more components of the aircraft to perform at least a portion of the function associated with the at least one selected virtual element.

16. The aircraft of claim 15, wherein the intended input location is a location modeled based at least in part on the received data indicative of the sensed vibration.

17. The aircraft of claim 16, wherein the intended input location is a location corresponding to an object of visual focus.

18. The aircraft of claim 17, wherein the one or more interactive virtual elements remain in fixed locations on the touch screen display device from commencement of the intended user interaction to at least until the actual user interaction when the input device touches the touch screen display device.

* * * * *

UNITED STATES PATENT AND TRADEMARK OFFICE
CERTIFICATE OF CORRECTION

PATENT NO. : 10,996,793 B2
APPLICATION NO. : 15/627586
DATED : May 4, 2021
INVENTOR(S) : Henderson et al.

It is certified that error appears in the above-identified patent and that said Letters Patent is hereby corrected as shown below:

In the Claims

Claim 1, Column 17, Line 28, delete "error:" and insert -- error; --.

Signed and Sealed this
Eleventh Day of October, 2022

*Katherine Kelly Vidal*

Katherine Kelly Vidal
*Director of the United States Patent and Trademark Office*